Sept. 15, 1931. R. BRODER 1,822,881
AUTOMOBILE HAND GRIP
Filed June 23, 1930 2 Sheets-Sheet 1
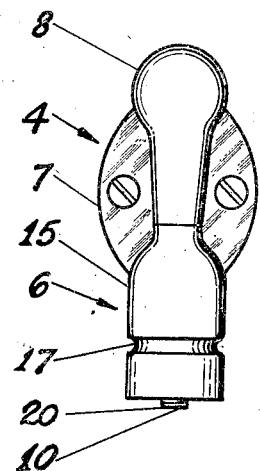
Fig. 2
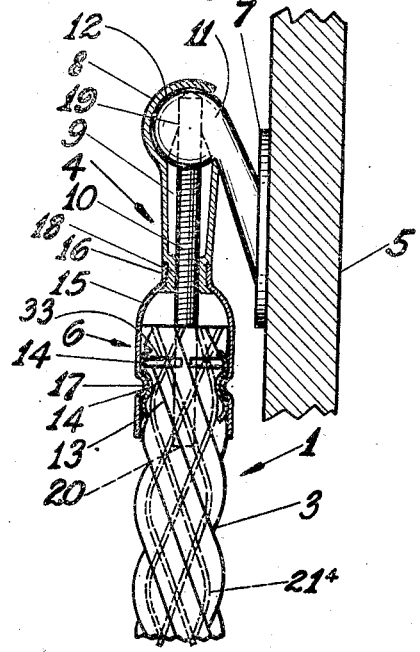
Fig. 1
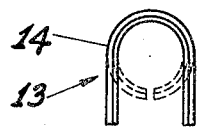
Fig. 3
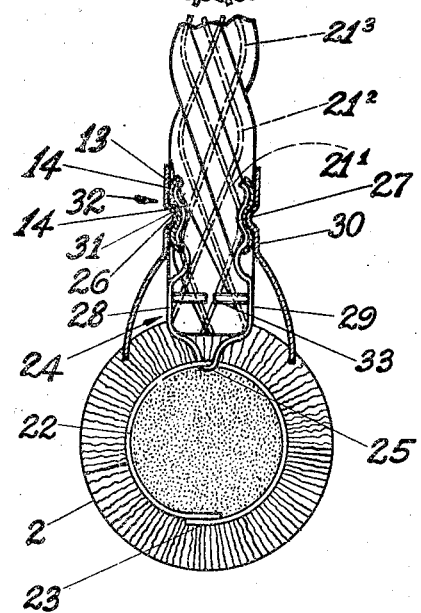
INVENTOR
REUBEN BRODER
BY Joseph Blacker
ATTORNEY Sept. 15, 1931.　　R. BRODER　　1,822,881
AUTOMOBILE HAND GRIP
Filed June 23, 1930　　2 Sheets-Sheet 2
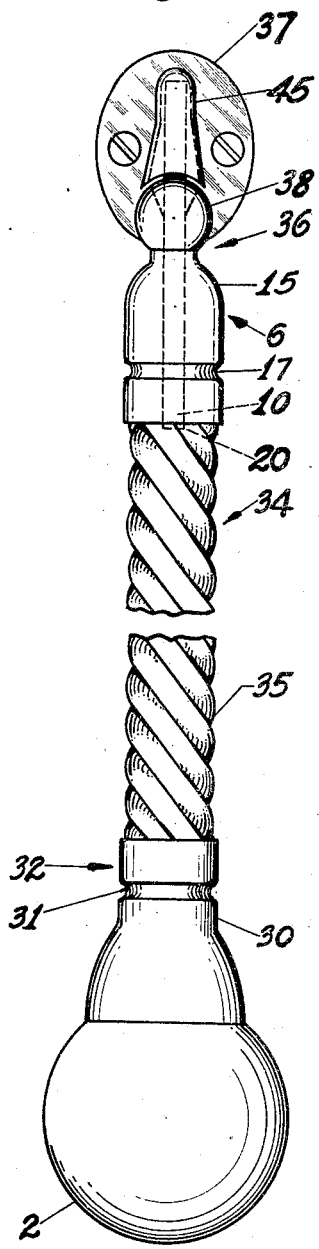
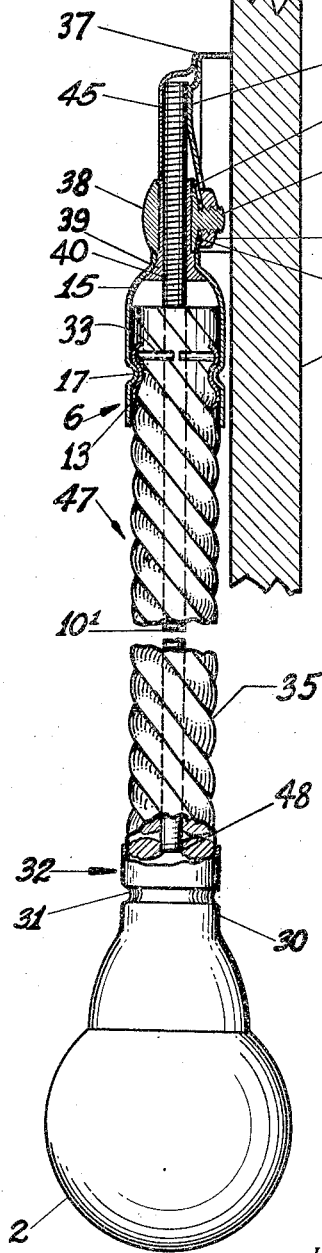
INVENTOR.
REUBEN BRODER
BY Joseph Blacker
ATTORNEY Patented Sept. 15, 1931

1,822,881

UNITED STATES PATENT OFFICE

REUBEN BRODER, OF NEW YORK, N. Y.

AUTOMOBILE HAND GRIP

Application filed June 23, 1930. Serial No. 463,098.

This invention relates to a new and improved automobile hand grip and is an improvement on my automobile hand grip application Serial Number 377,464, which has been allowed on May 16, 1930. The said automobile hand grip consists of a cord assembly, a pompon and a swivelling attaching device. The attaching device at the upper end of the hand grip as disclosed in the said application consists of a stationary bracket, a clamping member on the cord assembly and a swivelling member connecting the clamping member and cord assembly to said stationary bracket. I have found in actual practice that while it is desirable to retain the swivelling feature, and permit movement of the cord assembly relative to the stationary bracket, that spring means must be provided to return the cord assembly to a predetermined upright position when moved from said position.

An object of this invention is to provide resilient means to return the cord assembly to its original predetermined upright position with respect to the stationary bracket, when moved from said position.

Another object of this invention is to provide an attaching device for a vehicle hand grip comprising a swivelling member adapted for supporting a weight thereon and for housing resilient means therein to return the said swivelling member and vehicle hand grip to a predetermined upright position in a vehicle body.

Another object of this invention is to provide a swivelling attaching device for a vehicle hand grip comprising a combined stationary bracket and a hollow swivelling member, housing a resilient spring therein which extends longitudinally into the body of the vehicle hand grip and returns the swivelling member and the vehicle hand grip to a predetermined upright position in a vehicle body.

Another object of this invention is to provide improved means for fastening a grip member or pompon at one end of the cord assembly and for fastening an attaching device at the other end of the cord assembly.

With the above and other objects in view the invention will be hereinafter more particularly described and the combination and arrangement of parts will be shown in the accompanying drawings and pointed out in the claims which form part of this specification. It being understood that the embodiments herewith shown are merely illustrative and that various changes in the form, proportion, size and minor details of construction within the scope of the claims, may be resorted to without departing from the spirit or sacrificing any of the advantages of the invention.

Reference will now be had to the drawings, wherein like numerals of reference designate corresponding parts throughout the several views, in which:

Figure 1 is a side elevation of an automobile hand grip partly in section, attached in an upright position to a member of a vehicle body and shows a resilient ball-jointed swivelling attaching device having a spring therein and a resilient cord assembly having a spring wire within each twisted cord.

Figure 2 is a front view of the resilient ball-jointed attaching device.

Figure 3 is a top view of a corrugated U shaped blank which may be closed up to form a corrugated split bushing.

Figure 4 is a front elevation of a modified form of automobile hand grip and shows a resilient swivelling attaching device having a spring therein and extending into a cord assembly which is without any spring wires in the cords and is not resilient.

Figure 5 is a modification of the form of hand grip shown in Figure 4, attached in an upright position to a member of a vehicle body and shows a swivelling attaching device having a spring therein and which extends downwardly into the cord assembly and stops short of the lower end thereof.

The embodiment of the invention shown in Figure 1, illustrates an automobile hand grip 1, comprising a pompon 2, a cord assembly 3, and a swivelling attaching device 4, suspended in an upright position from a member 5, of a vehicle body.

The swivelling attaching device 4, comprises a clamping member 6, on the cord assembly 3, and a bracket 7, fastened to the body member 5, and a hollow swivelling member 8. The swivelling member 8, is provided with a longitudinal aperture 9, which allows free movement therein of a coil spring 10. The swivelling member 8, is attached in swivelling junction with the bracket 7, by means of a spherical upper end 11, on the bracket 7, which is housed in a spherical cavity 12, in the swivelling member 8.

A split or slit bushing 13, having a plurality of corrugations 14, 14, and originally of U shaped form as best shown in Figure 3, is pressed in place at the attaching end of the cord assembly 3, and engages the twisted cords. A cap or enclosure 15, having a small aperture 16, at the upper end thereof is placed on the bushing 13 and a circular corrugation 17, best shown in Figure 2, is rolled into the cap 15. The corrugation 17, enters a corresponding corrugation 14, in the bushing 13, and locks the cap to the bushing, and prevents the bushing from opening up and becoming disengaged from the cord assembly 3. The clamping member 6, thus consists of the bushing 13, and the cap 15. The swivelling member 8, is provided at its lower end with a shouldered sleeve portion 18, which abuts against the upper portion of the cap 15; the sleeve 18, enters the aperture 16, in the cap 15, and is riveted to the cap. The clamping member 6, is thus integrally united with the member 8, and in swivelling relation with the bracket 7, and serves to insure a non-restraining swivelling connection whereby the hand grip 1, may swing in all directions.

The spring 10, is housed within an aperture 19, in the spherical upper end 11, and within the aperture 9, in the member 8, and extends longitudinally within the cord assembly 3, and terminates at a point 20, at the lower end of the clamping member 6, and is clamped within the cord assembly by the said member 6, but is free to move within the swivelling member 8, and within the spherical end 11. The spring 10, thus serves to align the cord assembly 3, with the bracket 7, and to return the cord assembly to its predetermined upright position relative said bracket when moved from said position. The external swivelling member 8, supports the entire load exerted on the cord assembly 3, and the internal spring 10, is not subjected to any tensile strain.

As shown in Figure 1, spring wires $21^1$, $21^2$, $21^3$, $21^4$, have been incorporated in the respective cords of the cord assembly 3, and serve to make the cord assembly resilient and to maintain its straight line form. It will thus be noted that the improved automobile hand grip 1, shown in Figure 1, is provided with a resilient cord assembly 3, as well as a resilient attaching device 4, which represents an advance in the automobile hand grip art.

The pompon 2, is preferably of the ball shaped form and has a member 22, which circumscribes the pompon. The ends of said circumscribing member may be twisted and drawn up tight or may be overlapped at the point 23, on the pompon. A substantially U shaped member 24, is positioned at the lower end of the cord assembly and has a loop 25, in its lower side for engaging with the member 22, and loops 26, 27, in its parallel sides 28, 29, for engaging with the cord assembly 3. The two parallel sides 28, 29, continue longitudinally on opposite sides and parallel to the cord assembly 3. A split bushing 13, having a plurality of corrugations 14, 14, is pressed against the sides 28, 29, the corrugations 14, 14, engaging the loops 26, 27, and clamp the sides 28, 29, to the cord assembly 3. An enclosing sleeve 30, is placed on the bushing 13, and a circular corrugation 31, is rolled into the sleeve 30, and enters a corresponding corrugation 14, in the bushing 13, and locks the sleeve to the bushing. When the enclosing sleeve 30, is in position, the split bushing 13, is hidden therein.

It will thus be noted that the clamping member 32, for the pompon consists of the enclosing sleeve 30, and the bushing 13, and operates in substantially the same manner as the clamping member 6, for the attaching device. In addition to the clamping members 6, and 32, binding members 33, 33, best shown in Figure 1, are used at each end of the cord assembly to hold the individual cords in their proper twisted positions.

As shown in Figure 4, there has been provided a modified form of automobile hand grip 34, comprising a pompon 2, a cord assembly 35, and a swivelling attaching device 36. The swivelling attaching device 36, comprises a clamping member 6, on the cord assembly 35, a bracket 37, and a hollow swivelling member 38.

As shown in Figure 5, the swivelling member 38, is provided with a connecting member 39, having a longitudinal aperture 40, which allows free movement therein of a coil spring 10, shown in Figure 4, and Figure 1. The swivelling member 38, is attached in swivelling junction with the bracket 37, by means of a right-angularly extending threaded stud 41, and nut 42. The swivelling member 38, is provided with a spherical convex face 43, which engages with a corresponding spherical cavity 44, formed in the bracket 37. A clamping member 6, the same as shown in Figure 1, is attached to the cord assembly 35, and is riveted to the swivelling member 38, by means of the connecting member 39. The clamping member 6, is thus integrally united with the member 38, and in swivelling relation with the bracket 37, and serves to insure a swivelling connection whereby the hand grip 34, may swing in all directions. The spring is slidably housed within an outwardly extending hollow projection 45, in the bracket 37, and within the aperture 40, in the connecting member 39, and a covering washer 46, within the bracket 37, maintains the spring in an aligned position.

Referring to Figure 4, it will be noted that the spring 10, is clamped in the clamping member 6, and is free to slide in the swivelling member 38, and in the bracket 37. The spring 10, terminates in the cord assembly 35, at a point 20, the same as in Figure 1. The cord assembly 35, is without any spring wires in the respective cords such as are shown in Figure 1, and is not resilient. It will thus be noted that the automobile hand grip 34, shown in Figure 4, has a resilient attaching device and a non-resilient cord assembly. The pompon 2, and the clamping member 32, are duplicates of that shown in Figure 1.

As shown in Figure 5, there has been provided a modified form of automobile hand grip 47, having a cord assembly 35, the same as that shown in Figure 4, but in which the spring $10^1$, has been extended from the clamping member 6, longitudinally within the cord assembly 35, and stops short of the clamping member 32, and the lower end 48, of the spring $10^1$, is not clamped within the cord assembly 35, or within the clamping member 32.

The upper end of the spring $10^1$, is free to slide in the swivelling member 38, and in the bracket 37, but is clamped in the clamping member 6.

It is to be noted that in all the three embodiments herewith shown both ends of the spring are not clamped, but that the spring is clamped relative to the cord assembly at a point intermediate the ends of the spring, that is within the clamping member 6.

It is also to be noted that while two preferred forms of resilient and swivelling attaching devices have been disclosed herewith, that many more modifications may be made to comprise swivelling housing members which support the hand grip and in which the internal spring is not subjected to any tensile strain or pull.

Having thus described my invention, I claim as new and desire to secure by Letters Patent:

1. In combination, a vehicle hand grip comprising a cord assembly, a clamping member on said cord assembly, a bracket, and a swivelling member connecting the clamping member and cord assembly to said bracket in an upright position and housing an elongated spring therein which extends therethrough at both ends, one end of said spring extending into the bracket and the other end extending longitudinally within the cord assembly, said spring serving to return the swivelling member and the cord assembly to the predetermined upright position relative said bracket when moved from said position.

2. In combination with an upright member of a vehicle body and a bracket affixed to said upright member, a vehicle hand grip comprising a cord assembly attached in an upright position relative said upright body member and in swivelling junction with said bracket to permit angular movement of said cord assembly relative said upright body member, and an elongated spring within said bracket and extending longitudinally within said cord assembly, said elongated spring serving to return the cord assembly to the predetermined upright position relative said upright body member when moved from said position.

3. In combination, a vehicle hand grip, comprising a cord assembly, a clamping member at the attaching end of said cord assembly, a bracket and a swivelling member connecting the clamping member and the cord assembly to said bracket in an upright position and housing an elongated spring therein which extends therethrough at both ends, one end of said spring extending upwardly into the said bracket and the other end extending downwardly within said cord assembly and stopping short of the lower end thereof.

4. In combination, a vehicle hand grip comprising a pompon secured at the lower end of a cord assembly, a clamping member secured at the upper end of said cord assembly, a bracket and a swivelling member connecting the said clamping member and cord assembly to said bracket in an upright position and slidably housing an elongated spring therein, said spring extending through the swivelling member upwardly into the bracket and downwardly into the cord assembly and stopping short of the lower end of the cord assembly and the said spring being clamped within the cord assembly at the upper end thereof.

5. In combination with a vehicle body and a bracket affixed to said body, a vehicle hand grip comprising a cord assembly attached in a vertical plane to and in swivelling junction with said bracket, and an elongated spring within said bracket and extending longitudinally within said cord assembly to align said cord assembly with said bracket and to return the cord assembly to the vertical plane when moved therefrom.

6. A resilient attaching device for a vehicle hand grip comprising a cord assembly, a bracket and a clamping member on said cord assembly, said clamping member being secured in non-restrained swivelling junction with the bracket by means of a hollow swivelling member connected to the clamping member, an elongated coil spring positioned within said attaching device to align said cord assembly with said bracket and to return the cord assembly to said aligned position when moved therefrom.

7. A resilient attaching device for a vehicle hand grip comprising a cord assembly, a bracket and a clamping member on said cord assembly, said clamping member being secured in non-restrained swivelling junction with the bracket by means of a hollow swivelling member connected to the clamping member, an elongated coil spring positioned within said attaching device to align said cord assembly with said bracket and to return the cord assembly to said aligned position when moved therefrom, said coil spring being slidably housed within said bracket and within said hollow swivelling member and clamped within the cord assembly at the upper end thereof.

8. In combination, a pompon, a cord assembly therefor, a circumscribing member on said pompon, a U shaped member having its lower side in engagement with said circumscribing member and having its parallel sides extending on opposite sides of the cord assembly, and means for clamping the said parallel sides to the cord assembly.

9. In combination, a vehicle hand grip comprising a swivelling attaching device and cord assembly, and an elongated spring housed within said attaching device and within said cord assembly to impart resiliency to said attaching device and to said cord assembly.

Signed at New York in the county of New York and State of New York, this 18th day of June, A. D. 1930.

REUBEN BRODER.